US009509483B2

(12) United States Patent
Damnjanovic et al.

(10) Patent No.: US 9,509,483 B2
(45) Date of Patent: Nov. 29, 2016

(54) UPLINK CONTROL AND DATA TRANSMISSION IN MULTIFLOW-ENABLED NETWORKS

(71) Applicant: QUALCOMM Incorporated, San Diego, CA (US)

(72) Inventors: Jelena Damnjanovic, Del Mar, CA (US); Yongbin Wei, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 14/076,931

(22) Filed: Nov. 11, 2013

(65) Prior Publication Data

US 2014/0133415 A1    May 15, 2014

Related U.S. Application Data

(60) Provisional application No. 61/725,368, filed on Nov. 12, 2012, provisional application No. 61/725,399, filed on Nov. 12, 2012.

(51) Int. Cl.
*H04B 7/00* (2006.01)
*H04L 5/00* (2006.01)
(Continued)

(52) U.S. Cl.
CPC ........... *H04L 5/0078* (2013.01); *H04L 5/0035* (2013.01); *H04L 5/0053* (2013.01);
(Continued)

(58) Field of Classification Search
CPC .. H04W 76/02; H04W 76/025; H04W 76/04
USPC ........ 370/310, 328, 350, 464; 445/425, 464, 445/450, 522
See application file for complete search history.

(56) References Cited

U.S. PATENT DOCUMENTS 8,614,978 B2  12/2013  Che et al.
8,804,632 B2   8/2014  Lee et al.
(Continued)

FOREIGN PATENT DOCUMENTS

WO    WO-2012136269 A1    10/2012

OTHER PUBLICATIONS

CMCC: "Discussion on support of different TDD UL-DL configurations on different bands", 3GPP Draft; R1-113452 Discussion on Support of Different TDD UL-DL Configurations on Different Bands, 3rd Generation Partnership Project (3GPP), MOB1 LE Competence Centre ; 658, Route Des Lucioles ; F-86921 Sophi A-Anti Polis Cedex ; France, vol. Ran WG1, No. Zhuhai; Oct. 10, 2011, Oct. 5, 2011 (2011-18-85), XP050538540, section 1 section 2.1 section 3.4.1, 'Scenario 1'.
(Continued)

*Primary Examiner* — Dmitry H Levitan
(74) *Attorney, Agent, or Firm* — Norton Rose Fulbright US LLP

(57) ABSTRACT

Signaling and procedural considerations are disclosed for uplink multiflow operations in user equipment configured for carrier aggregation. Advanced wireless networks may take advantage of unused capacity of neighboring cells by configuring network nodes and UEs to both receive on the downlink and transmit on the uplink to multiple cells or network nodes. Implementing multiflow on UE for the uplink transmission process may cause issues in various channels, signaling, and procedural operations that may be addressed through data and control signaling the techniques disclosed herein.

28 Claims, 9 Drawing Sheets

(51) Int. Cl.
| | |
|---|---|
| H04W 52/14 | (2009.01) |
| H04W 52/30 | (2009.01) |
| H04W 72/04 | (2009.01) |
| H04W 52/02 | (2009.01) |
| H04W 52/32 | (2009.01) |
| H04W 52/34 | (2009.01) |
| H04W 52/36 | (2009.01) |
| H04W 76/04 | (2009.01) |
| H04L 25/02 | (2006.01) |
| H04W 56/00 | (2009.01) |

(52) U.S. Cl.
CPC ....... *H04W52/0216* (2013.01); *H04W 52/146* (2013.01); *H04W 52/30* (2013.01); *H04W 52/325* (2013.01); *H04W 52/346* (2013.01); *H04W 52/365* (2013.01); *H04W 72/0413* (2013.01); *H04W 76/048* (2013.01); *H04L 5/001* (2013.01); *H04L 5/0042* (2013.01); *H04L 5/0048* (2013.01); *H04L 25/0224* (2013.01); *H04W 56/0005* (2013.01); *H04W 56/0045* (2013.01); *Y02B 60/50* (2013.01)

(56) References Cited

U.S. PATENT DOCUMENTS

| | | | |
|---|---|---|---|
| 8,831,690 | B2 | 9/2014 | Perets et al. |
| 8,923,253 | B2 | 12/2014 | Park et al. |
| 8,964,593 | B2 * | 2/2015 | Dinan ............... 370/252 |
| 8,989,025 | B2 | 3/2015 | Kazmi et al. |
| 9,014,138 | B2 | 4/2015 | Fong et al. |
| 9,301,183 | B2 * | 3/2016 | Heo ............... H04W 52/0258 |
| 2011/0305161 | A1 | 12/2011 | Ekpenyong et al. |
| 2012/0176967 | A1 | 7/2012 | Kim et al. |
| 2012/0257569 | A1 | 10/2012 | Jang et al. |
| 2013/0142113 | A1 * | 6/2013 | Fong et al. ............... 370/328 |
| 2014/0029558 | A1 | 1/2014 | Frederiksen et al. |
| 2014/0071862 | A1 | 3/2014 | Ji et al. |
| 2014/0119304 | A1 | 5/2014 | Li |
| 2014/0133474 | A1 | 5/2014 | Damnjanovic et al. |
| 2014/0348105 | A1 | 11/2014 | Rosa et al. |
| 2015/0319753 | A1 * | 11/2015 | Chen ............... G01N 33/57446 370/277 |

OTHER PUBLICATIONS

International Search Report and Written Opinion—PCT/US2013/069631—ISA/EPO—Apr. 23, 2014.

Qualcomm Incorporated: 'Air interface considerations for dual connectivity', 3GPP Draft; R2-131159; 3rd Generation Partnership Project (3GPP), Mobile Competence Centre; 650, Route Des Lucioles; F-06921 Sophia-Antipolis Cedex; France f vol. Ran W62, No. #81bis Apr. 4, 2013, XP050699140, Retrieved from the Internet: URL:http://www.3gpp.org/ftp/tsg_ran/WG2_RL2/TSGR2_81bisiDocs/.

Qualcomm Incorporated: "Details on UL power control in carrier aggregation setting", 3GPP Draft; R1-101480 UL Power Control for MC, 3rd Generation Partnership Project (3GPP), Mobile Competence Centre; 650, Route Des Lucioles; F-06921 Sophia-Anti Polis Cedex; France, vol. Ran WG1, No. San Francisco, USA; Feb. 16, 2010, XP050418934 [retrieved on Feb. 16, 2010] the whole document.

Seidel E., "LTE-A Carrier Aggregation Enhancements in Release 11", Aug. 2012 [Aug. 28, 2012], XP055100680, Retrieved from the Internet: URL:http://www.nomor.de/uploads/44/31/4431565c44fed73a799493f63b07aeaf/NewsletterNomor_CA_Enhancements_2012-08.pdf [retrieved on Feb. 6, 2014] p. 1, left-hand column.

Taiwan Search Report—TW102141186—TIPO—Mar. 10, 2015.

3GPP TS 36.213 V11.0.0, 3rd Generation Partnership Project; LTE Physical layer procedures, 3GPP, Oct. 2012, pp. 1-145.

Taiwan Search Report—TW102141187—TIPO—Apr. 30, 2015.

Taiwan Search Report—TW102141186—TIPO—Dec. 22, 2015.

"3rd Generation Partnership Project; Technical Specification Group Radio Access Network; Evolved Universal Terrestrial Radio Access (EUTRA) and Evolved Universal Terrestrial Radio Access Network (EUTRAN); Overall description; Stage 2 (Release 11)", 3GPP STANDARD; 3GPP TS 36.300, 3rd Generation Partnership Project (3GPP), Mobile Competence Centre; 650, Route Des Lucioles; F-06921 Sophia-Antipolis Cedex; France, vol. RAN WG2, No. v11.3.0, Sep. 24, 2012, pp 1-205, XP050649950.

Catt: "Signaling for TAG Configuration", 3GPP DRAFT; R2-115791, 3rd Generation Partnership Project (3GPP), Mobile Competence Centre; 650, Route Des Lucioles; F-06921 Sophia-Antipolis Cedex; France, vol. RAN WG2, No. San Francisco, USA; Nov. 14-18, 2011, Nov. 8, 2011, XP050564300.

NTT Docomo et al., "Discussion on Multiple-TA Capability Signalling", 3GPP DRAFT; R2- 125591 Discussion on Multiple-TA Capability Signaling, 3rd Generation Partnership Project. (3GPP), MOBILE Competence Centre; 650, Route Des Lucioles; F-06921 Sophia-Antipolis Cedex; F vol. RAN WG2, No. New Orleans, USA; Nov. 12, 2012-Nov. 16, 2012, Nov. 3, 2012, XP050667458, Retrieved from the Internet: URL:http://www.3gpp.org/ftp/tsg_ran/WG2_RL2/TSGR2_80/Docs/.

Taiwan Search Report—TW102141186—TIPO—Aug. 23, 2016.

* cited by examiner

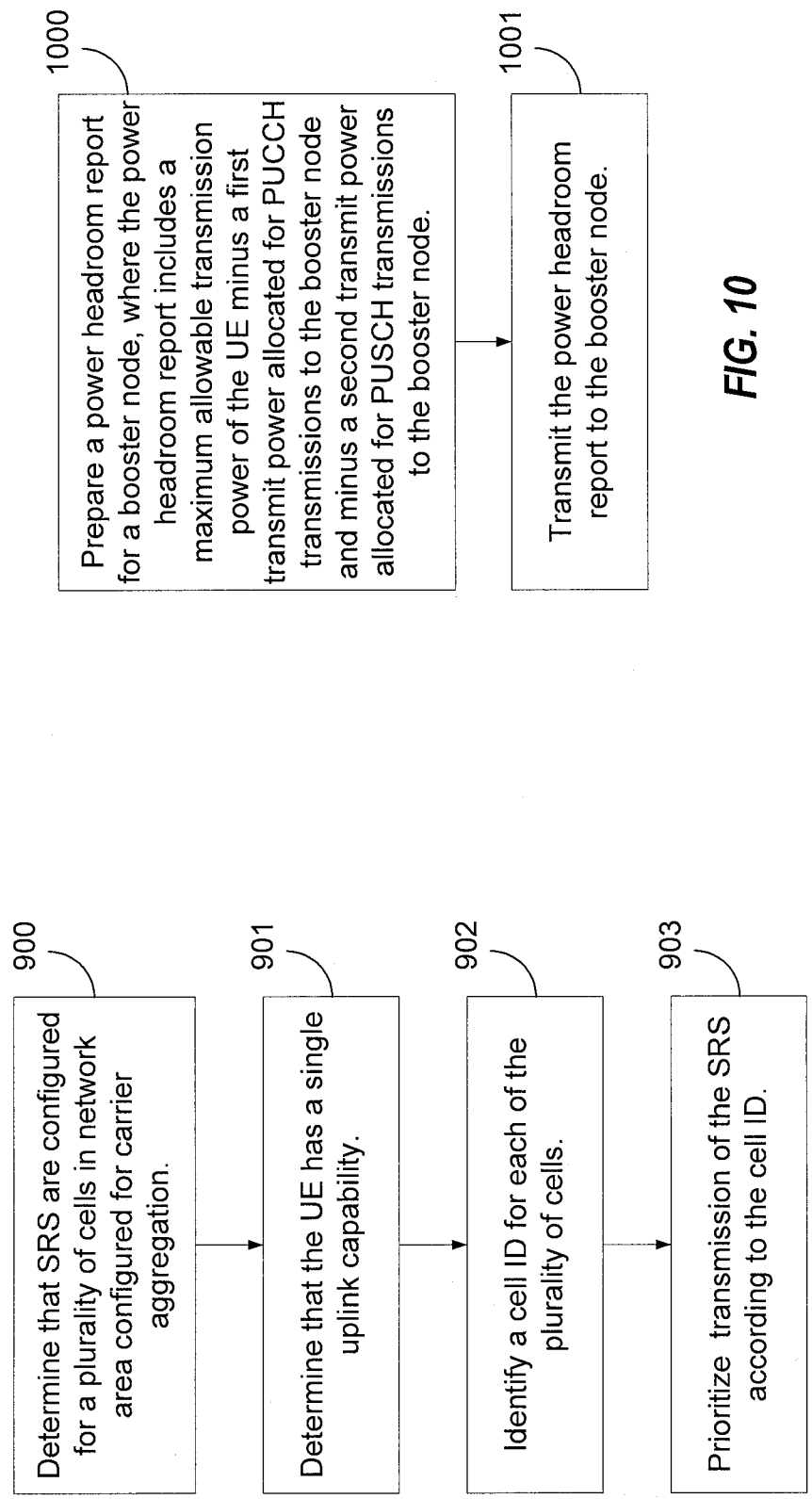

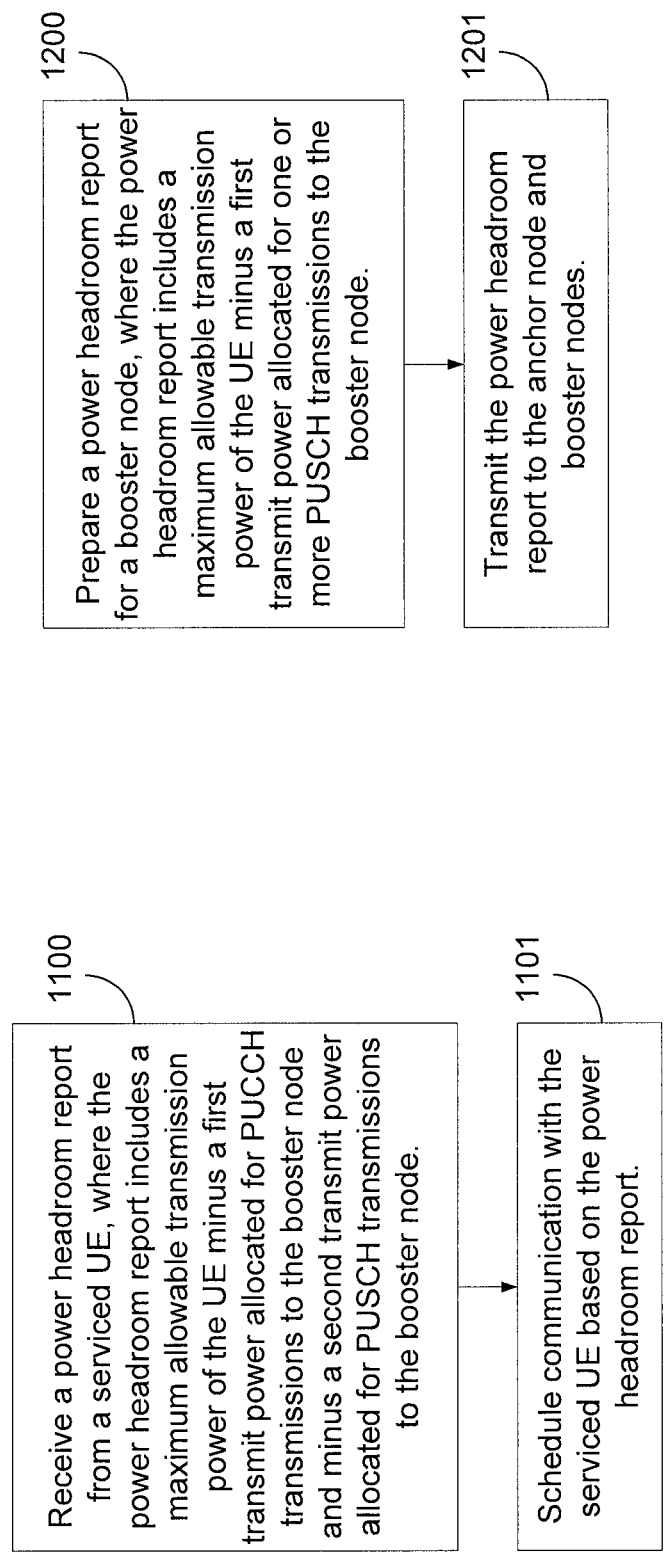

UPLINK CONTROL AND DATA TRANSMISSION IN MULTIFLOW-ENABLED NETWORKS

CROSS-REFERENCE TO RELATED APPLICATIONS

This application claims the benefit of U.S. Provisional Patent Application No. 61/725,368, entitled, "UPLINK CONTROL AND DATA TRANSMISSION IN MULTI-FLOW-ENABLED NETWORKS," filed on Nov. 12, 2012, and U.S. Provisional Patent Application No. 61/725,399, entitled, "UPLINK TRANSMISSION FOR CARRIER AGGREGATION VIA MULTIPLE NODES," filed on Nov. 12, 2012, which are expressly incorporated by reference herein in its entirety.

BACKGROUND

Field

Aspects of the present disclosure relate generally to wireless communication systems, and more particularly, to uplink control and data transmission in multiflow-enabled networks.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

The various aspects of the present disclosure are direct to methods, apparatus, non-transitory computer readable media that include program code that causes a computer to perform various actions and features, and apparatus that include processors and memory configured to perform the actions and functionality as described herein. Each of these methods, apparatuses, and media may embody various aspects and features as described herein and illustrated in the accompanying figures. Such examples provide only non-limiting implementations of the concepts and elements described herein.

Various aspects of the present disclosure are directed to compiling, at a UE, a physical uplink control channel (PUCCH) transmission for a secondary cell in communication with the UE, receiving a transmit power control command from the secondary cell, wherein the transmit power control is received in a downlink control information message, and transmitting the PUCCH to the secondary cell according to the transmit power control command.

Further aspects of the present disclosure are directed to preparing, at a UE, a plurality of PUCCH transmissions and one or more physical uplink shared channel (PUSCH) transmissions for multiflow uplink transmission to two or more cells, determining, at the UE, that the UE is power limited, prioritizing a power allocation of the UE across the plurality of PUCCH transmissions, and prioritizing the power allocation of the UE across the one or more PUSCH transmissions.

Further aspects of the present disclosure are directed to reporting, by a UE, a multiple uplink capability of the UE and receiving configuration for the UE to perform multiflow uplink transmission for one or more cells regardless of a timing adjustment group (TAG) to which the one or more cells belongs.

Further aspects of the present disclosure are directed to reporting, by a UE, a single uplink capability of the UE and receiving, at the UE, configuration for the UE to perform multiflow uplink transmission for one or more cells only in response to each of the one or more cells belonging to a same TAG.

Further aspects of the present disclosure are directed to determining, at a UE configured for multiflow operation, that sounding reference signals (SRS) are configured for a plurality of cells in the multiflow, determining, at the UE, that the UE has a single uplink capability, identifying a cell identifier (ID) for each of the plurality of cells, and prioritizing transmission of the SRS according to the cell ID in a subframe where collision of SRS is detected.

Further aspects of the present disclosure are directed to preparing a power headroom report, at a UE configured for multiflow operation, for a secondary cell, wherein the power headroom report includes a maximum allowable transmission power of the UE for that cell minus a first transmit power allocated for PUCCH transmissions to the secondary cell and minus a second transmit power allocated for PUSCH transmissions, and transmitting the power headroom report to the secondary cell.

Further aspects of the present disclosure are directed to preparing a power headroom report, at a UE configured for multiflow operation, for a primary cell and a secondary cell, wherein the power headroom report includes a maximum allowable transmission power of the UE for the corresponding cell minus a first transmit power allocated for one or more PUSCH transmissions, and transmitting the power headroom report to the primary and secondary cells.

Further aspects of the present disclosure are directed to receiving, at a secondary cell, a power headroom report from a serviced UE configured for multiflow operation, wherein the power headroom report includes a maximum allowable transmission power of the UE minus a first transmit power allocated for PUCCH transmissions to the secondary cell and minus a second transmit power allocated for PUSCH transmissions, and scheduling, at the secondary cell, communication with the serviced UE based on the power headroom report.

Further aspects of the present disclosure are directed to receiving, at a secondary cell, a power headroom report from a serviced UE configured for multiflow operation, wherein the power headroom report includes a maximum allowable transmission power of the UE minus a first transmit power allocated for one or more PUSCH transmissions, and scheduling, at the secondary cell, communication with the serviced UE based on the power headroom report.

Further aspects of the present disclosure are directed to receiving, at a UE configured for multiflow operation, a configuration for a secondary set of discontinuous reception (DRX) subframes for one or more secondary cells, wherein the secondary set for one or more secondary cells is related to a primary set of DRX subframes of a primary cell, and tuning away, by the UE, one or more radios of the UE according to the secondary set of DRX subframes.

In an additional aspect of the disclosure, a method of wireless communication by a multi-uplink capable UE includes preparing, at the UE, a plurality of uplink control channel transmissions for a plurality of nodes in multiflow communication with the UE over a plurality of CC, the plurality of nodes comprising a first node having a primary cell (PCell) for communicating with the UE and a second node having a secondary cell (SCell) for communicating with the UE, wherein each of the plurality of uplink control channel transmissions is configured for a corresponding node of the plurality of nodes on one of the plurality of CCs associated with the corresponding node, receiving a transmit power control command on the SCell of the plurality of nodes, wherein the transmit power control is received in a downlink control information message from the second node, and transmitting an uplink control channel transmission of the plurality of uplink control channel transmissions to the second node according to the transmit power control command.

In an additional aspect of the disclosure, a method of wireless communication includes preparing, at a UE, a plurality of uplink control channel transmissions and one or more uplink shared channel transmissions for multiflow uplink transmission to two or more non co-located nodes, determining, at the UE, that the UE is power limited, and applying a power allocation of the UE according to a prioritization in which application of the power allocation across the plurality of uplink control signal transmissions is prioritized over application of the power allocation the one or more uplink shared channel transmissions.

In an additional aspect of the disclosure, a method of wireless communication includes reporting, by a UE, a multiple uplink capability of the UE and receiving configuration for the UE to perform multiflow uplink transmission for one or more non co-located nodes belonging to one or more TAGs, wherein each of the one or more non co-located nodes belongs to a separate one of the one or more TAGs.

In an additional aspect of the disclosure, a method of wireless communication includes generating, by a UE, a plurality of SRS for each of a plurality of non co-located nodes in multiflow communication with the UE, determining, at the UE, that the UE has a single uplink capability, identifying a cell ID for each of the plurality of non co-located nodes, and prioritizing transmission of the plurality of SRS according to the cell ID in a subframe where collision of two or more of the plurality of SRS is detected.

In an additional aspect of the disclosure, a method of wireless communication includes preparing a power headroom report, at a UE configured for multiflow operation with a plurality of non co-located nodes, for a booster or secondary node of the plurality of non co-located nodes, wherein the power headroom report includes a maximum allowable transmission power of the UE for the booster or secondary node minus a first transmit power allocated for uplink control signal transmissions to the booster or secondary node and minus a second transmit power allocated for uplink shared channel transmissions, and transmitting the power headroom report to the booster or secondary node.

In an additional aspect of the disclosure, a method of wireless communication includes receiving, at a booster or secondary node of a plurality of non co-located nodes, a power headroom report from a serviced UE configured for multiflow operation with the plurality of non co-located nodes, wherein the power headroom report includes a maximum allowable transmission power of the UE minus a first transmit power allocated for uplink control signal transmissions to the booster or secondary node and minus a second transmit power allocated for uplink shared channel transmissions, and scheduling, at the booster or secondary node, communication with the serviced UE based on the power headroom report.

In an additional aspect of the disclosure, a method of wireless communication includes receiving, at a UE configured for multiflow operation with a plurality of non co-located nodes, a configuration for a secondary set of DRX subframes for one or more secondary cells of the plurality of non co-located nodes, wherein the secondary set of DRX subframes for one or more secondary cells is separate from a primary set of DRX subframes of a primary cell of the plurality of non co-located nodes, and tuning away, by the UE, one or more radios of the UE according to the secondary set of DRX subframes.

In an additional aspect of the disclosure, an apparatus configured for wireless communication includes means for preparing, at the UE, a plurality of uplink control channel transmissions for a plurality of nodes in multiflow communication with the UE over a plurality of CC, the plurality of nodes comprising a first node having a primary cell (PCell) for communicating with the UE and a second node having a secondary cell (SCell) for communicating with the UE, wherein each of the plurality of uplink control channel transmissions is configured for a corresponding node of the plurality of nodes on one of the plurality of CCs associated with the corresponding node, means for receiving a transmit power control command on the SCell of the plurality of nodes, wherein the transmit power control is received in a downlink control information message from the second node, and means for transmitting an uplink control channel transmission of the plurality of uplink control channel transmissions to the second node according to the transmit power control command.

In an additional aspect of the disclosure, an apparatus configured for wireless communication includes means for preparing, at a UE, a plurality of uplink control channel transmissions and one or more uplink shared channel transmissions for multiflow uplink transmission to two or more non co-located nodes, means for determining, at the UE, that the UE is power limited, and means for applying a power allocation of the UE according to a prioritization in which application of the power allocation across the plurality of uplink control signal transmissions is prioritized over application of the power allocation the one or more uplink shared channel transmissions.

In an additional aspect of the disclosure, an apparatus configured for wireless communication includes means for reporting, by a UE, a multiple uplink capability of the UE and means for receiving configuration for the UE to perform multiflow uplink transmission for one or more non co-located nodes belonging to one or more TAGs, wherein each of the one or more non co-located nodes belongs to a separate one of the one or more TAGs.

In an additional aspect of the disclosure, an apparatus configured for wireless communication includes means for generating, by a UE, a plurality of SRS for each of a plurality of non co-located nodes in multiflow communication with the UE, means for determining, at the UE, that the UE has a single uplink capability, means for identifying a cell ID for each of the plurality of non co-located nodes, and means for prioritizing transmission of the plurality of SRS according to the cell ID in a subframe where collision of two or more of the plurality of SRS is detected.

In an additional aspect of the disclosure, an apparatus configured for wireless communication includes means for preparing a power headroom report, at a UE configured for multiflow operation with a plurality of non co-located nodes, for a booster or secondary node of the plurality of non co-located nodes, wherein the power headroom report includes a maximum allowable transmission power of the UE for the booster or secondary node minus a first transmit power allocated for uplink control signal transmissions to the booster or secondary node and minus a second transmit power allocated for uplink shared channel transmissions, and means for transmitting the power headroom report to the booster or secondary node.

In an additional aspect of the disclosure, an apparatus configured for wireless communication includes means for receiving, at a booster or secondary node of a plurality of non co-located nodes, a power headroom report from a serviced UE configured for multiflow operation with the plurality of non co-located nodes, wherein the power headroom report includes a maximum allowable transmission power of the UE minus a first transmit power allocated for uplink control signal transmissions to the booster or secondary node and minus a second transmit power allocated for uplink shared channel transmissions, and means for scheduling, at the booster or secondary node, communication with the serviced UE based on the power headroom report.

In an additional aspect of the disclosure, an apparatus configured for wireless communication includes means for receiving, at a UE configured for multiflow operation with a plurality of non co-located nodes, a configuration for a secondary set of DRX subframes for one or more secondary cells of the plurality of non co-located nodes, wherein the secondary set of DRX subframes for one or more secondary cells is separate from a primary set of DRX subframes of a primary cell of the plurality of non co-located nodes, and means for tuning away, by the UE, one or more radios of the UE according to the secondary set of DRX subframes.

In an additional aspect of the disclosure, a computer program product having a computer-readable medium having program code recorded thereon is disclosed. This program code includes code to prepare, at the UE, a plurality of uplink control channel transmissions for a plurality of nodes in multiflow communication with the UE over a plurality of CC, the plurality of nodes comprising a first node having a primary cell (PCell) for communicating with the UE and a second node having a secondary cell (SCell) for communicating with the UE, wherein each of the plurality of uplink control channel transmissions is configured for a corresponding node of the plurality of nodes on one of the plurality of CCs associated with the corresponding node, code to receive a transmit power control command on the SCell of the plurality of nodes, wherein the transmit power control is received in a downlink control information message from the second node, and code to transmit an uplink control channel transmission of the plurality of uplink control channel transmissions to the second node according to the transmit power control command.

In an additional aspect of the disclosure, a computer program product having a computer-readable medium having program code recorded thereon is disclosed. This program code includes code to prepare, at a UE, a plurality of uplink control channel transmissions and one or more uplink shared channel transmissions for multiflow uplink transmission to two or more non co-located nodes, code to determine, at the UE, that the UE is power limited, and code to apply a power allocation of the UE according to a prioritization in which application of the power allocation across the plurality of uplink control signal transmissions is prioritized over application of the power allocation the one or more uplink shared channel transmissions.

In an additional aspect of the disclosure, a computer program product having a computer-readable medium having program code recorded thereon is disclosed. This program code includes code to report, by a UE, a multiple uplink capability of the UE and code to receive configuration for the UE to perform multiflow uplink transmission for one or more non co-located nodes belonging to one or more TAGs, wherein each of the one or more non co-located nodes belongs to a separate one of the one or more TAGs.

In an additional aspect of the disclosure, a computer program product having a computer-readable medium having program code recorded thereon is disclosed. This program code includes code to generate, by a UE, a plurality of SRS for each of a plurality of non co-located nodes in multiflow communication with the UE, code to determine, at the UE, that the UE has a single uplink capability, code to identify a cell ID for each of the plurality of non co-located nodes, and code to prioritize transmission of the plurality of SRS according to the cell ID in a subframe where collision of two or more of the plurality of SRS is detected.

In an additional aspect of the disclosure, a computer program product having a computer-readable medium having program code recorded thereon is disclosed. This program code includes code to prepare a power headroom report, at a UE configured for multiflow operation with a plurality of non co-located nodes, for a booster or secondary node of the plurality of non co-located nodes, wherein the power headroom report includes a maximum allowable transmission power of the UE for the booster or secondary node minus a first transmit power allocated for uplink control signal transmissions to the booster or secondary node and minus a second transmit power allocated for uplink shared channel transmissions, and code to transmit the power headroom report to the booster or secondary node.

In an additional aspect of the disclosure, a computer program product having a computer-readable medium having program code recorded thereon is disclosed. This program code includes code to receive, at a booster or secondary node of a plurality of non co-located nodes, a power headroom report from a serviced UE configured for multiflow operation with the plurality of non co-located nodes, wherein the power headroom report includes a maximum allowable transmission power of the UE minus a first transmit power allocated for uplink control signal transmissions to the booster or secondary node and minus a second transmit power allocated for uplink shared channel transmissions, and code to schedule, at the booster or secondary node, communication with the serviced UE based on the power headroom report.

In an additional aspect of the disclosure, a computer program product having a computer-readable medium having program code recorded thereon is disclosed. This program code includes code to receive, at a UE configured for multiflow operation with a plurality of non co-located nodes, a configuration for a secondary set of DRX subframes for one or more secondary cells of the plurality of non co-located nodes, wherein the secondary set of DRX subframes for one or more secondary cells is separate from a primary set of DRX subframes of a primary cell of the plurality of non co-located nodes, and code to tune away, by the UE, one or more radios of the UE according to the secondary set of DRX subframes.

In an additional aspect of the disclosure, an apparatus includes at least one processor and a memory coupled to the processor. The processor is configured to prepare, at the UE, a plurality of uplink control channel transmissions for a plurality of nodes in multiflow communication with the UE over a plurality of CC, the plurality of nodes comprising a first node having a primary cell (PCell) for communicating with the UE and a second node having a secondary cell (SCell) for communicating with the UE, wherein each of the plurality of uplink control channel transmissions is configured for a corresponding node of the plurality of nodes on one of the plurality of CCs associated with the corresponding node, to receive a transmit power control command on the SCell of the plurality of nodes, wherein the transmit power control is received in a downlink control information message from the second node, and to transmit an uplink control channel transmission of the plurality of uplink control channel transmissions to the second node according to the transmit power control command.

In an additional aspect of the disclosure, an apparatus includes at least one processor and a memory coupled to the processor. The processor is configured to prepare, at a UE, a plurality of uplink control channel transmissions and one or more uplink shared channel transmissions for multiflow uplink transmission to two or more non co-located nodes, to determine, at the UE, that the UE is power limited, and to apply a power allocation of the UE according to a prioritization in which application of the power allocation across the plurality of uplink control signal transmissions is prioritized over application of the power allocation the one or more uplink shared channel transmissions.

In an additional aspect of the disclosure, an apparatus includes at least one processor and a memory coupled to the processor. The processor is configured to report, by a UE, a multiple uplink capability of the UE and to receive configuration for the UE to perform multiflow uplink transmission for one or more non co-located nodes belonging to one or more TAGs, wherein each of the one or more non co-located nodes belongs to a separate one of the one or more TAGs.

In an additional aspect of the disclosure, an apparatus includes at least one processor and a memory coupled to the processor. The processor is configured to generate, by a UE, a plurality of SRS for each of a plurality of non co-located nodes in multiflow communication with the UE, to determine, at the UE, that the UE has a single uplink capability, to identify a cell ID for each of the plurality of non co-located nodes, and to prioritize transmission of the plurality of SRS according to the cell ID in a subframe where collision of two or more of the plurality of SRS is detected.

In an additional aspect of the disclosure, an apparatus includes at least one processor and a memory coupled to the processor. The processor is configured to prepare a power headroom report, at a UE configured for multiflow operation with a plurality of non co-located nodes, for a booster or secondary node of the plurality of non co-located nodes, wherein the power headroom report includes a maximum allowable transmission power of the UE for the booster or secondary node minus a first transmit power allocated for uplink control signal transmissions to the booster or secondary node and minus a second transmit power allocated for uplink shared channel transmissions, and to transmit the power headroom report to the booster or secondary node.

In an additional aspect of the disclosure, an apparatus includes at least one processor and a memory coupled to the processor. The processor is configured to receive, at a booster or secondary node of a plurality of non co-located nodes, a power headroom report from a serviced UE configured for multiflow operation with the plurality of non co-located nodes, wherein the power headroom report includes a maximum allowable transmission power of the UE minus a first transmit power allocated for uplink control signal transmissions to the booster or secondary node and minus a second transmit power allocated for uplink shared channel transmissions, and to schedule, at the booster or secondary node, communication with the serviced UE based on the power headroom report.

In an additional aspect of the disclosure, an apparatus includes at least one processor and a memory coupled to the processor. The processor is configured to receive, at a UE configured for multiflow operation with a plurality of non co-located nodes, a configuration for a secondary set of DRX subframes for one or more secondary cells of the plurality of non co-located nodes, wherein the secondary set of DRX subframes for one or more secondary cells is separate from a primary set of DRX subframes of a primary cell of the plurality of non co-located nodes, and to tune away, by the UE, one or more radios of the UE according to the secondary set of DRX subframes.

BRIEF DESCRIPTION OF THE DRAWINGS

FIG. 9 is a block diagram illustrating example blocks executed to implement one aspect of the present disclosure.

FIG. 10 is a block diagram illustrating example blocks executed to implement one aspect of the present disclosure.

FIG. 11 is a block diagram illustrating example blocks executed to implement one aspect of the present disclosure.

FIG. 12 is a block diagram illustrating example blocks executed to implement one aspect of the present disclosure.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
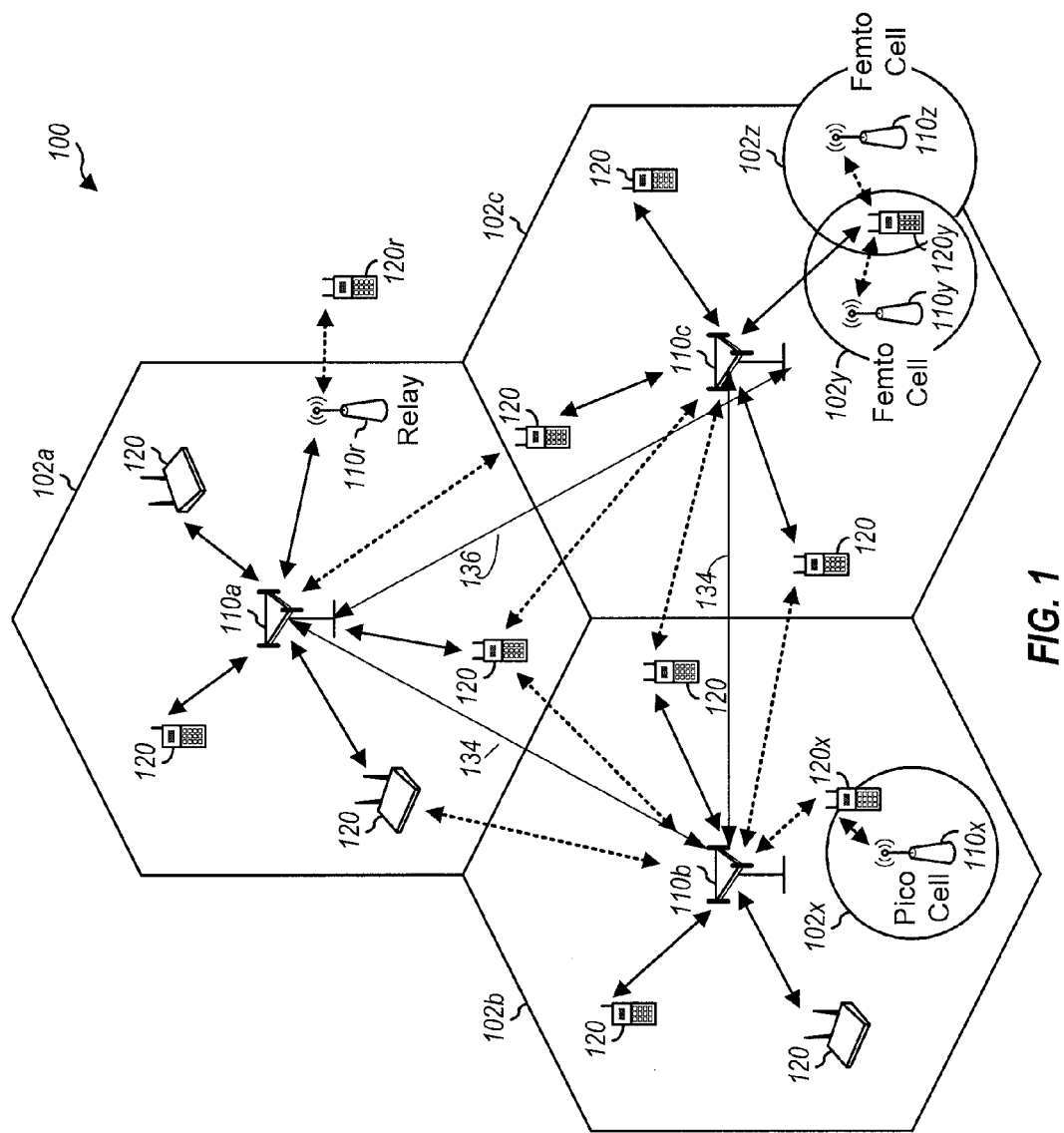
FIG. 1 is a block diagram illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range expansion (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120$y$ may be close to the femto eNB 110$y$ and may have high received power for the eNB 110$y$. However, the UE 120$y$ may not be able to access the femto eNB 110$y$ due to restricted association and may then connect to the macro eNB 110$c$ (as shown in FIG. 1) or to the femto eNB 110$z$ also with lower received power (not shown in FIG. 1). The UE 120$y$ may then observe high interference from the femto eNB 110$y$ on the downlink and may also cause high interference to the eNB 110$y$ on the uplink. Using coordinated interference management, the eNB 110$c$ and the femto eNB 110$y$ may communicate over the backhaul 134 to negotiate resources. In the negotiation, the femto eNB 110$y$ agrees to cease transmission on one of its channel resources, such that the UE 120$y$ will not experience as much interference from the femto eNB 110$y$ as it communicates with the eNB 110$c$ over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 μs (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 2:
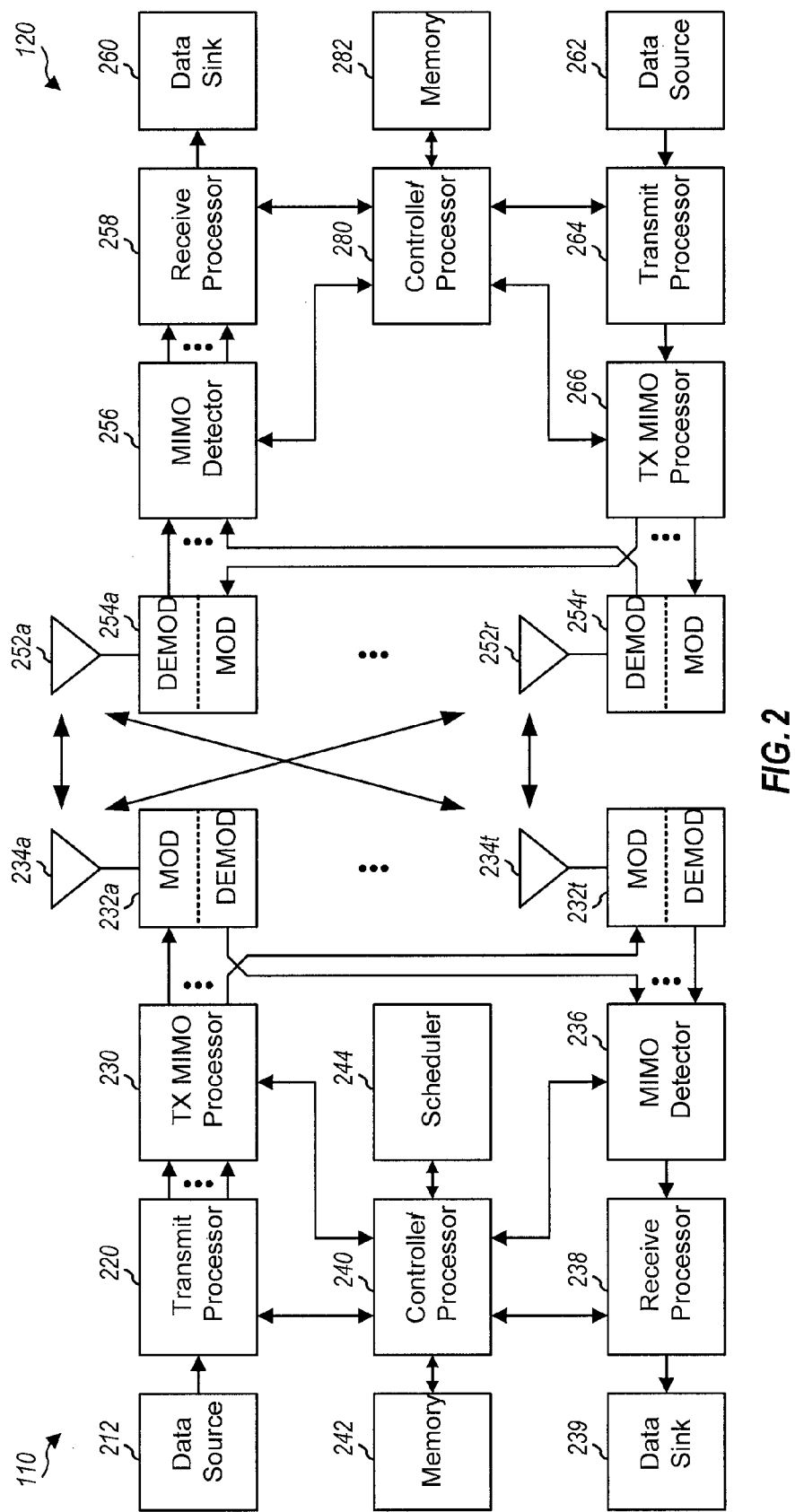
FIG. 2 is a block diagram illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110$c$ in FIG. 1, and the UE 120 may be the UE 120$y$. The eNB 110 may also be a base station of some other type. The eNB 110 may be equipped with antennas 234$a$ through 234$t$, and the UE 120 may be equipped with antennas 252$a$ through 252$r$.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232$a$ through 232$t$. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232$a$ through 232$t$ may be transmitted via the antennas 234$a$ through 234$t$, respectively.

At the UE 120, the antennas 252$a$ through 252$r$ may receive the downlink signals from the eNB 110 and may provide received signals to the demodulators (DEMODs) 254$a$ through 254$r$, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254$a$ through 254$r$, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the eNB 110. At the eNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 5-13, and/or other processes for the techniques described herein. The memories 242 and 282 may store data and program codes for the eNB 110 and the UE 120, respectively. A scheduler 244 may schedule UEs for data transmission on the downlink and/or uplink.

LTE-Advanced UEs use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

For the LTE-Advanced mobile systems, two types of carrier aggregation (CA) methods have been proposed, continuous CA and non-continuous CA. Non-continuous CA occurs when multiple available component carriers are separated along the frequency band. On the other hand, continuous CA occurs when multiple available component carriers are adjacent to each other. Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

When located at the cell edge, a UE may experience weak signals from its serving cell with more interference from neighboring cells. This combination may result in reduced performance for cell edge UEs. Advanced wireless networks may take advantage of unused capacity of neighboring cells by configuring network nodes and UEs to both receive on the downlink and transmit on the uplink to multiple cells or network nodes. A first node may be considered an anchor cell or the main serving cell, while the additional cells used for the multiflow operations may be considered booster cells. A UE conducting multiflow communication between a first node and a second node that are non co-located and/or have non-ideal backhaul communication links may communicate with each of the nodes over multiple component carriers (CCs). In a CA aspect, a UE communicating with a node using multiple CCs will have a primary component carrier or cell (PCell) and additional secondary component carriers of cells (SCells).

Figure 3:
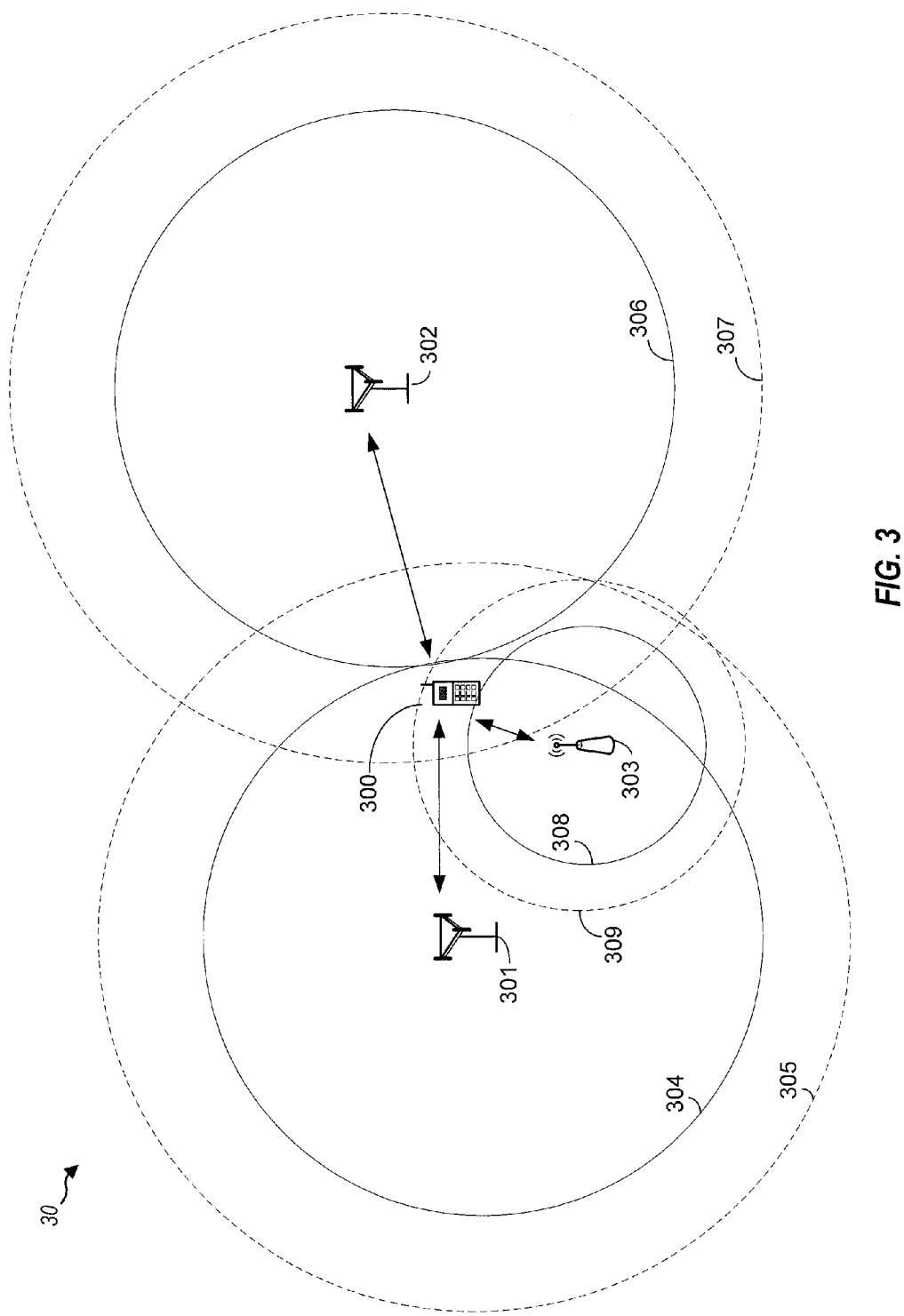
FIG. 3 is a block diagram illustrating a wireless network configured for multiflow operation.

FIG. 3 is a block diagram illustrating wireless network 30 configured for multiflow operation. UE 300 lies within the coverage area 304 of macro node 301. Macro node 301 also includes a cell range expansion (CRE) area defined between coverage area 304 and cell edge 305. UE 300 also lies within the CRE area of macro node 302, defined between coverage area 307 and cell edge 307, and the CRE area of remote radio head (RRH) 303, defined between coverage area 308 and cell edge 309. In normal operation without multiflow, UE 300 maintains active communication with macro node 301. The performance viewed at UE 300 may be impacted by interference from both macro node 302 and RRH 303. However, with multiflow operations enabled, UE 300 may receive separate downlink data from either or both of macro node 302 and RRH 303. Thus, by enabling multiflow operation, the performance at UE 300 may even increase by taking advantage of additional resources available at macro node 302 and RRH 303.

It should be noted that various types of network nodes may be used with multiflow operations, such as eNBs, RRHs, WIFI™ access points, NodeBs, and the like.

When operating on a network that supports for using CA, the CA standards provide for some PCell—specific functionalities. For example, advanced CA standards allow for uplink control in PUCCH only on the PCell. Thus, uplink control for all cells is conveyed on the PCell. This limitation in CA operation provides challenges to multiflow technology. In a multiflow environment, control for both bearer and packet level splitting should be conveyed to all nodes or cells involved in the downlink multiflow transmission. This may be relaxed in the case of packet splitting where there is a fiber connection among the multiple nodes participating in multiflow communication. Issues may also arise in uplink data transmission. Enabling the multiflow data transmission on uplink may be primarily related to the UE capability and timing advance (TA) grouping. FIG. 4A is a block diagram illustrating a detail of UE 120 configured according to one aspect of the present disclosure. UE 120 includes controller/processor 280 which controls the components and executes the software, firmware, or other logic that provide the features and functionality of UE 120. UE 120 may include components such as memory 282, transmitters 400, receivers 401, arithmetic unit 408, radio tuning control 409, power control 410, signal generator 411, and clock 412. Various software and logic may be stored on memory 282 that is executable by controller/processor 280 including multiflow operations 402, power control monitor 403, signal measurement 404, timing adjustment monitor 405, SRS generator 406, and tuning control 407, among others. Controller/processor 280 access memory 282 to execute these and other pieces of logic to operate the functionality of UE 120.

A UE can generally be either multi-uplink capable or single-uplink capable. A multi-uplink capable UE has the capability to tune its multiple transmitters to different transmission frequencies simultaneously. For example, radio tuning control 409 of UE 120 may be capable of tuning each of transmitters 400 to separate frequencies simultaneously. Otherwise, if radio tuning control 409 cannot provide such tuning, then UE 120 would only be able to transmit a single uplink transmission. Implementing multiflow communications with a UE for the uplink transmission process with the multiflow booster or secondary nodes may cause issues in various channels, signaling, and procedural operations, such as: power control (PC), pathloss (PL) estimation, timing adjustment grouping (TAG), sounding reference signal (SRS), random access (RA) processes, power headroom reporting (PHR), and discontinuous reception (DRX).

Figure 4B:
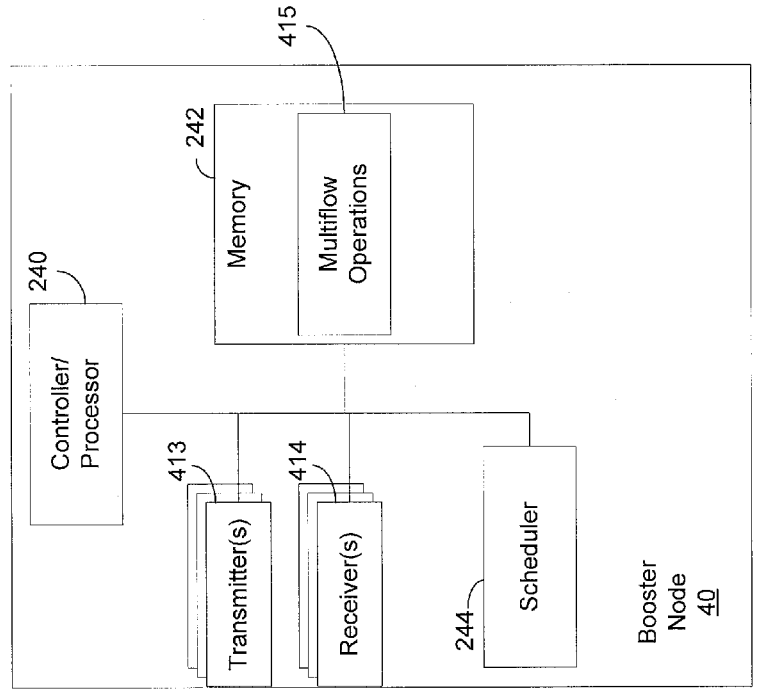
FIG. 4B is a block diagram illustrating a booster node configured according to one aspect of the present disclosure.
Figure 4A:
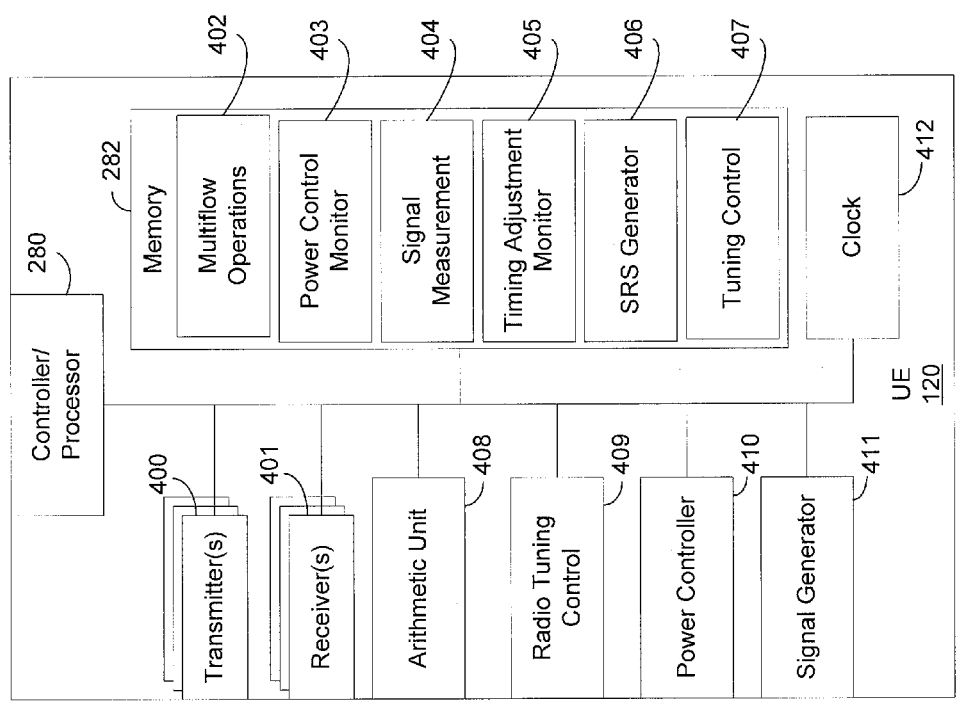
FIG. 4A is a block diagram illustrating a detail of a UE configured according to one aspect of the present disclosure.

FIG. 4B is a block diagram illustrating a booster node 40 configured according to one aspect of the present disclosure. Booster node 40 may include similar componentry as that included in eNB 110 (FIG. 2), including controller processor 240, memory 242, and scheduler 244. Transmitters 413 and receivers 414 may include the individual components, such as transmit processor 220, TX MIMO processor 230, mod/demods 232a-t, antennas 234a-t, MIMO detector 236, and receiver processor 238 (FIG. 2), much as transmitters 400 and receiver 401 may include the individual components, such as transmit processor 264, TX MIMO processor 266, demod/mod 254a-r, antennas 252a-r, MIMO detector 256, and receive processor 258 (FIG. 2). Booster node 40 may operate in multiflow networks through execution by controller/processor 240 of multiflow operations 415 in memory 242. The executing environment of multiflow operations 415 allow booster node 40 to receive uplink data and control information as a booster cell for a serviced UE and scheduling communications, through scheduler 244 under control of controller/processor 240, with the serviced UE based on the received control information and data.

In carrier aggregation, power control is defined separately for PUCCH and PUSCH for each CC. If multiple PUCCHs/PUSCHs are multiplexed on a single CC, separate power control for each of the channels should be provided. Transmit power control commands (TPC) in CA are provided in a downlink grant downlink control information (DCI) message of the PCell for PUCCH power control. For PUSCH power control, the TPC may be provided in an uplink grant DCI of the corresponding cell. If PUCCH transmission from a serviced UE is targeted for the booster or secondary node reception, the UE would need to receive the TPC in a downlink grant DCI of the booster or secondary node. However, in current network configurations, the fields of the downlink grant of the booster or secondary node are utilized for some other purpose, e.g., for PUCCH Format 3 resource allocation.

Figure 5:
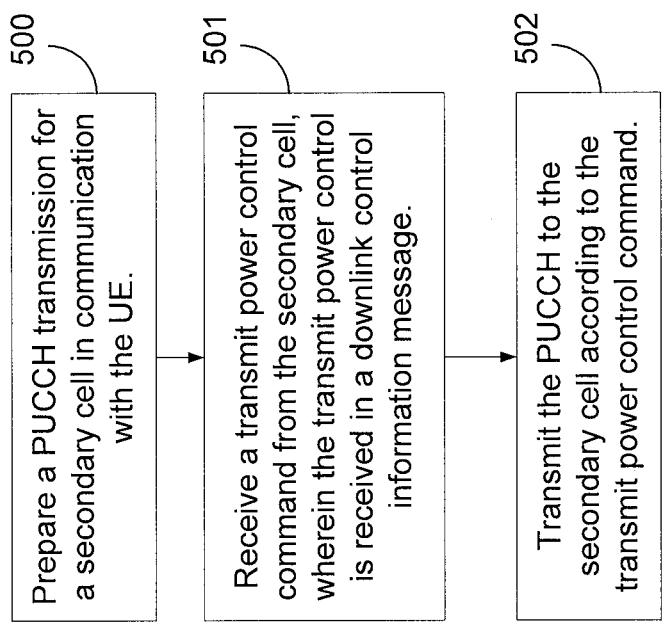
FIG. 5 is a block diagram illustrating example blocks executed to implement one aspect of the present disclosure.

FIG. 5 is a functional block diagram illustrating example blocks executed to implement one aspect of the present disclosure. At block 500, a UE participating in a multiflow operation prepares or compiles a PUCCH transmission for the booster or secondary node. For example, controller/processor 280 would control signal generator 411 to prepare a PUCCH transmission targeted for the booster or secondary node. The combination of these components and acts would provide means for compiling, at a UE, a PUCCH transmission for a booster or secondary node in communication with the UE.

At block 501, the UE would receive a TPC command from the booster or secondary node included in a DCI message from the booster or secondary node. UE 120 receives a transmission from booster or secondary node through receivers 401. Under control of controller/processor 280, UE 120 decodes the signal as a downlink grant with a DCI message that includes a TPC command. In various aspects of the present disclosure, the booster or secondary node may be configured, such as through RRC configuration to repurpose some of the existing bits of the DCI to accommodate a TPC command. For example, under existing standards, when a booster or secondary node is not configured to provide TPC commands or the UE is not configured to receive PUCCH on that booster or secondary node, the DCI bits are typically standardized to include information other than a TPC command. Accordingly, when multiflow operations cause such booster or secondary node to provide TPC commands or cause the UE to receive PUCCH on a booster or secondary node that was not provided for in the standard configuration of the DCI, various aspects of the present disclosure allow for re-purposing of the existing bits assigned for other purposes, to accommodate the new booster or secondary node provision of TPC commands or UE transmitting PUCCH to the booster or secondary node.

In additional aspects of the present disclosure, the defined size of the DCI message may be increased in the standards to accommodate such TPC commands from booster or secondary nodes. The combination of these components and acts may provide means for receiving a transmit power control command from the booster or secondary node, wherein the transmit power control is received in a downlink control information message.

At block 502, the UE transmits the PUCCH to the booster or secondary node according to the TPC received. Using the TPC, controller/processor 280 executes power control monitor 403 in memory 282. The executing environment of power control monitor 403 uses the TPC command received from the booster or secondary node to adjust the transmit power of the PUCCH transmission through power controller 410, under control of controller/processor 280. The combination of these components and acts may provide means for transmitting the PUCCH to the booster or secondary node according to the transmit power control command.

Figure 6:
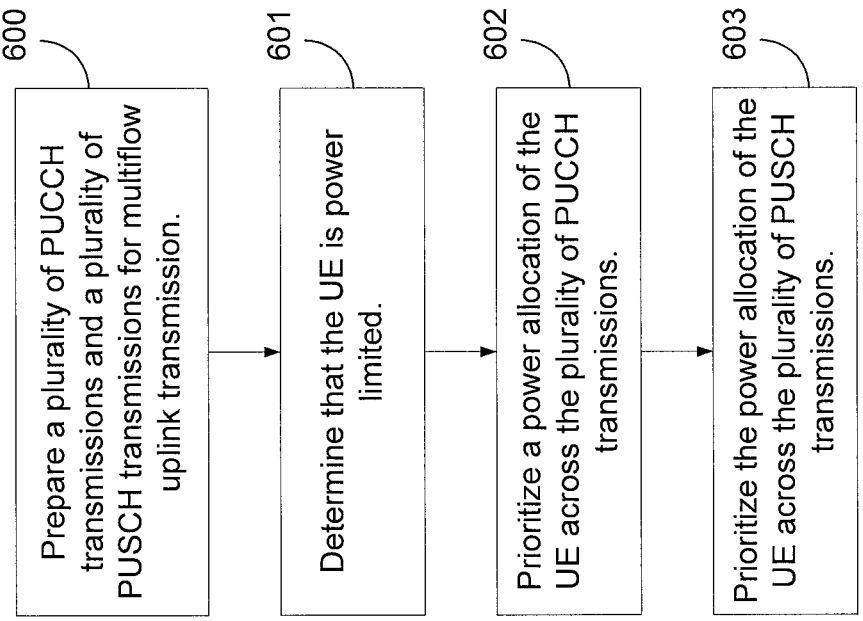
FIG. 6 is a block diagram illustrating example blocks executed to implement one aspect of the present disclosure.

Each UE has only a limited amount of power that can be used in transmitting data or control information, with multiflow uplink operations, that finite power may need to be scaled or prioritized for certain transmissions. While existing CA principles may be utilized, additional prioritization and scaling mechanisms may be introduced for uplink multiflow operation. FIG. 6 is a functional block diagram illustrating example blocks executed to implement one aspect of the present disclosure. At block 600, the UE schedules a number of PUCCH and PUSCH transmissions for multiflow operation. Executing multiflow operations 402 in memory 282, controller/processor 280 operates to generate multiple PUCCH and PUSCH transmissions targeted at the nodes participating in the multiflow operation. The combination of these components and acts may provide means for scheduling, at a UE, a plurality of PUCCH transmissions and one or more PUSCH transmissions for multiflow uplink transmission.

At block 601, through operation of power control monitor 403 by controller/processor 280, UE 120 determines that its maximum available power may not be sufficient to transmit all of the PUCCH and PUSCH transmissions that have been scheduled. The combination of these components and acts may provide means for determining, at the UE, that the UE is power limited.

At blocks 602 and 603, the UE prioritizes a power allocation across the multiple PUCCH and PUSCH transmissions scheduled for multiflow operation. Various numbers of prioritization schemes may be employed by the UE in order to prioritize or allocate the available UE power. For example, prioritization of the multiple PUCCHs may give the highest priority to PUCCHs targeted for the anchor node or, alternatively, the UE may scale across PUCCHs, either using a uniform or weighted scaling (e.g., weighting more for anchor node PUCCH). Similarly, prioritization of multiple PUSCHs may differentiate between the PUSCH that are carrying uplink control information and PUSCH that are carrying only data, in which PUSCH that carry uplink control information may receive a higher priority than pure data PUSCH transmissions. For example, in either case of a PUSCH carrying uplink control information or PUSCH only carrying data, the UE may again give the highest priority to the anchor node or scale, uniformly or weighted, across PUSCHs. Controller/processor 280 running both multiflow operations 402 and power control monitor 403 creates an operating environment in which the prioritization schemes within multiflow operation 402 works with power control monitor 403 to control power controller 410 to adjust the power accordingly across the various PUCCH and PUSCH transmissions scheduled for multiflow. Under control of controller/processor 280, power controller 410 applies the appropriate power to transmitters 400 while signal generator 411 prepares the PUCCH and PUSCH signals for transmission and radio tuning control 409, all under control of controller/processor 280, tunes transmitters 400 to the appropriate frequencies for transmission of the PUCCH and PUSCH. The combination of these components and acts may provide means for prioritizing a power allocation of the UE across the plurality of PUCCH transmissions and means for prioritizing the power allocation of the UE across the one or more PUSCH transmissions.

In CA, path loss estimation of a cell may be estimated either based on the corresponding downlink CC of the given cell, or the PCell, depending on which timing adjustment grouping (TAG) the serving cell belongs to. For example, with UE 120, controller/processor 280 executes signal measurement 404 functionality in memory 282 to enable measurement and determination of the path loss estimate from signals received through receivers 401. The same mechanism can be used for multiflow in cases where PUCCH/PUSCH are transmitted on the corresponding (separate) carriers of the corresponding nodes. Such cases may only be implemented using multi-uplink capable UEs. In cases where PUCCHs/PUSCHs are multiplexed on a single uplink CC (multiple cells configured on a single carrier), the reference cell for path loss estimation may be different. Although transmitted on the same CC, the uplink signal will have to reach different nodes. Conceptually, the current specification is applicable as those channels would be linked to the separate cells (although transmitted on the same carrier).

Because multiflow operations may connect a UE with base stations or nodes that are not in the same location or even within the same cell area, it is possible that the different cells with which the UE are communicating may not have the same timing adjustment (TA) and, therefore, not belong to the same TA grouping (TAG). Multiflow with the cells in different TAGs for a single uplink CC-capable UE may not be feasible, at least not with reasonable efficiency. An exception may also exist for fiber connected nodes or collocated nodes with packet level splitting. In most scenarios, however, multiflow operation with cells belonging to different TAGs will be configured for multi-uplink-capable UEs.

Figure 7:
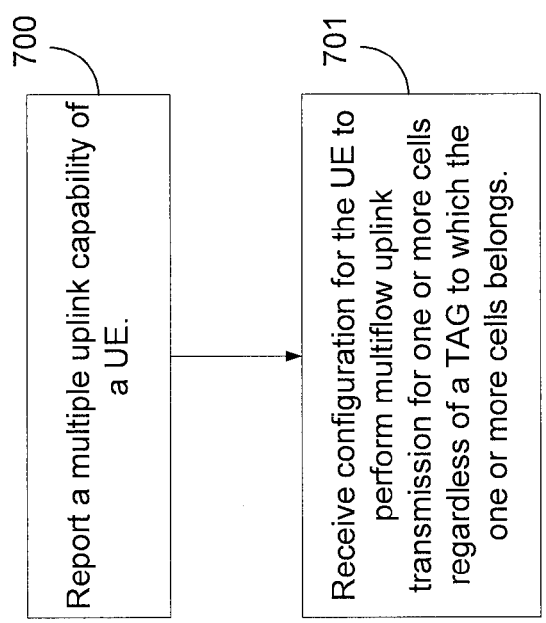
FIG. 7 is a block diagram illustrating example blocks executed to implement one aspect of the present disclosure.

FIG. 7 is a functional block diagram illustrating example blocks executed to implement one aspect of the present disclosure. At block 700, a UE reports a multiple uplink capability of a UE. For example, controller/processor 280 operates with radio tuning control 409 and will know whether radio tuning control 409 is capable of tuning transmitters 400 to different frequencies for simultaneous uplink transmission. UE 120 would report such a multi-uplink capability by sending a signal, generated by signal generator 411, under control of controller/processor 280, and transmitted by transmitters 400. The combination of these components and acts may provide means for reporting a multiple uplink capability of the UE.

At block 701, the UE receives configuration for the UE to perform multiflow uplink transmission for one or more cells regardless of a TAG to which the one or more cells belongs. For example, UE 120 may, under control of controller/processor 280, execute timing adjustment monitor 405 in memory 282. Timing adjustment monitor 405 monitors the TAG for each of the cells. UE 120 receives control signaling over receivers 401 with configuration information that allows multiflow operation for UE 120 with cells having different TAGs. The combination of these components and acts may provide means for receiving configuration for the UE to perform multiflow uplink transmission for one or more CA cells regardless of a TAG to which the one or more cells belongs.

Figure 8:
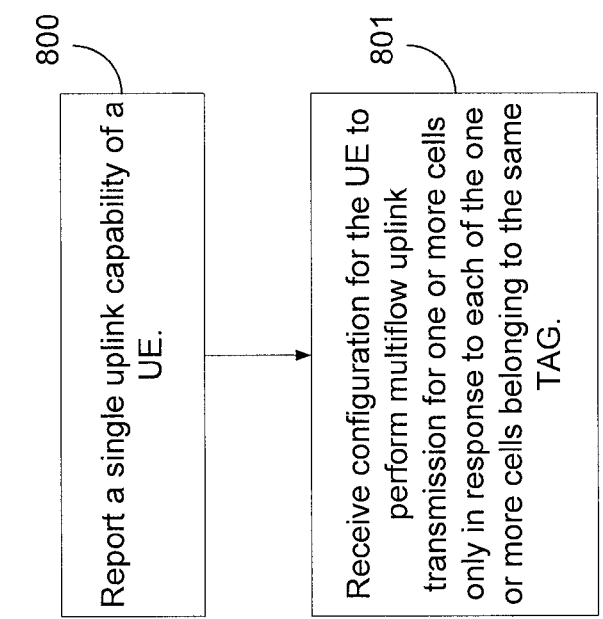
FIG. 8 is a block diagram illustrating example blocks executed to implement one aspect of the present disclosure.

FIG. 8 is a functional block diagram illustrating example blocks executed to implement one aspect of the present disclosure. At block 800, a UE reports a single uplink capability of a UE. For example, controller/processor 280 operates with radio tuning control 409 and will know whether radio tuning control 409 is capable of tuning transmitters 400 to different frequencies for simultaneous uplink transmission. UE 120 would report such a single uplink capability by sending a signal, generated by signal generator 411, under control of controller/processor 280, and transmitted by transmitters 400. The combination of these components and acts may provide means for reporting a single uplink capability of the UE.

At block 801, the UE receives configuration for the UE to perform multiflow uplink transmission for one or more cells that belong to the same TAG. For example, UE 120 may, under control of controller/processor 280, execute timing adjustment monitor 405 in memory 282. Timing adjustment monitor 405 monitors the TAG for each of the cells. UE 120 receives control signaling over receivers 401 with configuration information that allows multiflow operation for UE 120 with cells of the same TAG. The combination of these components and acts may provide means for receiving configuration for the UE to perform multiflow uplink transmission for one or more CA cells belonging to the same TAG.

Sounding reference signals (SRS) in CA are configured for each serving cell. A UE may be configured with SRS parameters for trigger type 0 (periodic) and trigger type 1 (aperiodic) SRS on each serving cell. SRS parameters are generally serving cell specific and semi-statically configurable by higher layers. For a multi-uplink-capable UEs, where each carrier frequency is associated with a single node, standard CA principles can be reused for multiflow operation. However, for a single-uplink-capable UEs, additional aspects should be considered when SRS are configured for transmission to multiple nodes.

For single-uplink-capable UEs, the behaviour to consider is in the subframes in which there are colliding SRS scheduled. In colliding subframes, a prioritization may be applied to SRS transmissions. FIG. 9 is a functional block diagram illustrating example blocks executed to implement one aspect of the present disclosure. At block 900, the UE determines that SRS are configured for multiple access nodes in a CA network with multiflow operations. Under control of controller/processor 280, multiflow operations 402, in memory 282, is executed along with SRS generator 406. Multiflow operations 402 includes triggers for scheduling multiple SRS targeted at the cells participating in the multiflow operation. The combination of these components and acts may provide means for determining, at a UE, that SRS are configured for a plurality of access nodes in network area configured for CA.

At block 901, the UE determines that it has a single-uplink capability. As noted above, controller/processor 280 operates with radio tuning control 409 and will know whether or not radio tuning control 409 is capable of tuning transmitters 400 to different frequencies for simultaneous uplink transmission. The combination of these components and acts may provide means for determining, at the UE, that the UE has a single uplink capability.

At block 902, the UE identifies a cell identifier (ID) for each of the cells or nodes participating in the multiflow operation. UE 120, under control of controller/processor 280 analyzes signals received over receivers 401. The cell IDs are included in some of the transmissions from the participating nodes that are received at UE 120. Thus, UE 120 can identify the different cell IDs of each of the participating nodes. The combination of these components and acts may provide means for identifying a cell ID for each of the plurality of access nodes.

At block 903, the UE prioritizes transmission of the SRS according to the SRS when SRS collision is detected. Various prioritization schemes may be utilized by the UE in order to prioritize SRS transmission. For example, priority may be given to the lowest cell ID of the participating nodes. In many scenarios, the PCell will have the lowest cell ID and, thus, be provided the highest priority in an SRS collision instance. UE 120, under control of controller/processor 280 compares the cell IDs of the participating nodes for which scheduled SRS collide in a particular subframe using arithmetic unit 408, which may include arithmetic units such as comparators, adders, subtractors, and the like. Based on the comparison of cell IDs, controller/processor 280 triggers executing SRS generator 406 to generate an SRS using signal generator 411. Controller/processor 280 identifies the particular node which has received priority for SRS transmission, which will then be transmitted over transmitters 400, using power controller 410 and radio tuning control 409. A UE may transmit the highest priority SRS and drop the rest or may transmit subsequent SRS at a next highest priority. The combination of these components and acts may provide means for prioritizing transmission of the SRS according to the cell ID in a subframe where a collision is detected.

In existing carrier aggregation standards, random access is enabled on both PCell and SCell, using a PDCCH order for SCell random access. For the multi-uplink UE, random access resources may be configured for each cell. For the single-uplink UE, a single TA can be supported.

With multiple signals being transmitted to multiple cells, the power headroom report (PHR) for UEs configured for CA with multiflow operations now should take into account the transmit power allocated for the additional transmissions. There are two types of PHR supported in current standards: Type 1 applies to both PCell and S Cell and is defined by the following equation:

$$PH = P_{cmax,c} - PUSCH\_tx\_pwr \quad (1)$$

where PH corresponds to the power headroom, Pcmax,c corresponds to the maximum allowable transmit power of the UE for that particular cell, and PUSCH_tx_pwr corresponds to the transmit power allocated for PUSCH transmission. Type 2 currently applies to only PCell and where PUCCH and PUSCH are simultaneously transmitted. Type 2 PHR is defined by the following equation:

$$PH = P_{cmax,c} - PUCCH\_tx\_pwr - PUSCH\_tx\_pwr \quad (2)$$

where, in addition to the elements defined with regard to equation (1), PUCCH_tx_pwr corresponds to the transmit power allocated for PUCCH transmission.

In the context of multiflow, where PUCCH is defined for transmission on a booster or secondary node, Type 2 PHR should also apply to the booster or secondary node as well. Accordingly, the various aspects of the present disclosure provide for configuration, such as through RRC messages, both a UE configured for CA and multiflow operation and participating booster or secondary node to transmit and receive Type 2 PHR. FIG. 10 is a functional block diagram illustrating example blocks executed to implement one aspect of the present disclosure. At block 1000, a UE configured for CA prepares a power headroom report for a booster or secondary node, where the power headroom report includes a maximum allowable transmission power of the UE minus a first transmit power allocated for PUCCH transmissions to the booster or secondary node and minus a second, transmit power allocated for PUSCH transmissions to the booster or secondary node. Controller/processor 280 executes multiflow operations 402 in memory 282 to create a multiflow operations environment in which an operating power control monitor 403 calculates a Type 2 PHR for PUCCH and PUSCH that are prepared for transmission on booster or secondary node. The combination of these components and acts may provide means for preparing a power headroom report, at a UE configured for CA, for a booster or secondary node, wherein the power headroom report includes a maximum allowable transmission power of the UE for that cell minus a first transmit power allocated for PUCCH transmissions to the booster or secondary node and minus a second transmit power allocated for PUSCH transmissions.

At block 1001, the UE transmits the PHR to the booster or secondary node. For example, UE 120 may transmit the PHR generated by power control monitor 403 over transmitters 400. The combination of these components and acts may provide means for transmitting the power headroom report to the booster or secondary node.

FIG. 11 is a functional block diagram illustrating example blocks executed to implement one aspect of the present disclosure from the SCell perspective. At block 1100, booster node 40 receives a power headroom report from a serviced UE, where the power headroom report includes a maximum allowable transmission power of the UE minus a first transmit power allocated for PUCCH transmissions to the secondary cell and minus a second transmit power allocated for PUSCH transmissions to the secondary cell. With reference to FIG. 4B, booster node 40 receives a PHR from a served UE over receivers 414. Controller/processor 240, which controls the componentry and executes the software, firmware, and other logic that defines the functionality and features of booster node 40, executes multiflow operations 415, stored in memory 242, which allows booster node 40 to understand receipt of PUCCH transmissions from a served UE where booster node 40 serves the UE as a secondary or booster node. The combination of these components and acts may provide means for receiving, at a booster or secondary node, a power headroom report from a serviced UE configured for CA, wherein the power headroom report includes a maximum allowable transmission power of the UE minus a first transmit power allocated for PUCCH transmissions to the secondary cell and minus a second transmit power allocated for PUSCH transmissions.

At block 1101, the booster or secondary node may schedule communication with the serviced UE based on the received power headroom report. Under control of controller/processor 240, scheduler 244 schedules communication through transmitters 413 with the serviced UE, where the scheduling is performed by scheduler 244 using the power headroom report. The combination of these components and acts may provide means for scheduling, at the secondary cell, communication with the serviced UE based on the power headroom report.

In cases of multiple PUCCHs/PUSCHs on a single CC, the power headroom formula may be adjusted to take into account additional channels. In the multiple transmissions case, the Type 1 PHR is defined by the following formula:

$$PH = P\text{c}\max,c - (\text{PUSCH\_tx\_pwr\_1} + \text{PUSCH\_tx\_pwr\_2} + \ldots) \quad (3)$$

in which the transmit power allocated for each PUSCH transmission is added and the aggregate transmit power allocated for the PUSCH transmissions is subtracted from Pcmax,c. The Type 2 PHR for the multiple transmissions case is defined by the following formula:

$$PH = P\text{c}\max,c - (\text{PUCCH\_tx\_pwr\_1} + \text{PUCCH\_tx\_pwr\_2} + \ldots) - (\text{PUSCH\_tx\_pwr\_1} + \text{PUSCH\_tx\_pwr\_2} + \ldots) \quad (4)$$

in which the transmit power allocated for each PUSCH and PUCCH transmission is added and the aggregate transmit power allocated for all of the PUSCH and PUCCH transmissions is subtracted from Pcmax,c. The resulting PHR may then be transmitted to the anchor node and booster or secondary node.

FIG. 12 is a functional block diagram illustrating example blocks executed to implement one aspect of the present disclosure. At block 1200, a UE prepares a power headroom report for a booster or secondary node, where the power headroom report includes a maximum allowable transmission power of the UE minus a first transmit power allocated for one or more PUSCH transmissions to the booster or secondary node. For example, controller/processor 280 executes multiflow operations 402 in memory 282 to create a multiflow operations environment in which an operating power control monitor 403 calculates PHR that account for multiple PUSCH transmissions. The combination of these components and acts may provide means for preparing a power headroom report, at a UE configured for CA, for a anchor node and a booster or secondary node, wherein the power headroom report includes a maximum allowable transmission power of the UE for the corresponding cell minus a first transmit power allocated for one or more PUSCH transmissions.

At block 1201, the UE transmits the PHR to both the anchor node and a booster or secondary nodes. For example, UE 120 may transmit the PHR generated by power control monitor 403 over transmitters 400. The combination of these components and acts may provide means for transmitting the power headroom report to the anchor node and a booster or secondary nodes.

Under current standards, the same discontinuous reception (DRX) operation will apply to all serving cells. The active times for PDCCH monitoring are identical across all downlink CCs. As an extension to the existing procedure, SCell DRX may be configured to be separately from PCell DRX. For example, SCell DRX may be configured to be an extended set of the PCell DRX subframes. That extended set may be a subset or a superset of the PCell DRX subframes depending on aspect of the disclosure being implemented. This configuration allows for more energy savings when downlink traffic is not so heavy.

Figure 13:
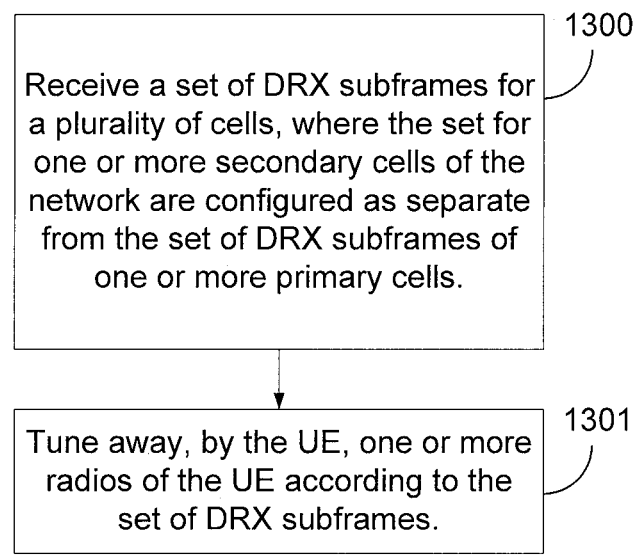
FIG. 13 is a block diagram illustrating example blocks executed to implement one aspect of the present disclosure.

FIG. 13 is a functional block diagram illustrating example blocks executed to implement one aspect of the present disclosure. At block 1300, a UE configured for CA and multiflow operations receives a set of DRX subframes for a plurality of cells, where the set for one or more secondary cells of the network are configured separately from the set of DRX subframes of the primary cell. For example, UE 120 receives through receivers 401a set of DRX subframes. This set of DRX subframes includes a set of SCell DRX that are configured as an extension of the set of PCell DRX. The combination of these components and acts may provide means for receiving, at a UE configured for CA, a configuration for a secondary set of DRX subframes for one or more secondary cells, wherein the secondary set for one or more secondary cells is related to a primary set of DRX subframes of a primary cell.

At block 1301, the UE tunes away its radios according to the received set of DRX subframes. For example, controller/processor 280 executes tuning control 407 which uses the set of DRX subframes to determine when to activate radio tuning control 409, under control of controller/processor 280, to tune receivers 401 away from the current frequencies for DRX operation. The combination of these components and acts may provide means for tuning away, by the UE, one or more radios of the UE according to the secondary set of DRX subframes.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5-13 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   reporting, by a user equipment (UE), a multiple uplink capability of the UE;
   receiving a configuration for the UE to perform multiflow uplink transmission for two or more nodes belonging to two or more timing adjustment groups (TAGs) wherein each of the two or more nodes belongs to a separate one of the two or more TAGs; and
   transmitting, by the UE, at least two physical uplink control channels (PUCCHs) to at least two nodes of the two or more nodes, wherein each of the at least two PUCCHs is generated for a corresponding one of the at least two nodes.

2. A user equipment (UE) configured for wireless communication, comprising:
   means for reporting a multiple uplink capability of the UE;
   means for receiving a configuration for the UE to perform multiflow uplink transmission for two or more nodes belonging to two or more timing adjustment groups (TAGs) wherein each of the two or more nodes belongs to a separate one of the two or more TAGs; and
   means for transmitting, by the UE, at least two physical uplink control channels (PUCCHs) to at least two nodes of the two or more nodes, wherein each of the at least two PUCCHs is generated for a corresponding one of the at least two nodes.

3. A computer program product for wireless communications in a wireless network, comprising:
   a non-transitory computer-readable medium having program code recorded thereon, the program code including:
      program code for causing a user equipment (UE) to report a multiple uplink capability of the UE;
      program code for causing the UE to perform multiflow uplink transmission for two or more nodes belonging to two or more timing adjustment groups (TAGs) wherein each of the two or more nodes belongs to a separate one of the two or more TAGs; and
      program code for causing the UE to transmit at least two physical uplink control channels (PUCCHs) to at least two nodes of the two or more nodes, wherein each of the at least two PUCCHs is generated for a corresponding one of the at least two nodes.

4. An apparatus configured for wireless communication, the apparatus comprising:
   at least one processor; and
   a memory coupled to the at least one processor,
   wherein the at least one processor is configured:
      to report, by the apparatus, a multiple uplink capability of the apparatus;
      to receive a configuration for the apparatus to perform multiflow uplink transmission for two or more nodes belonging to two or more timing adjustment groups (TAGs) wherein each of the two or more nodes belongs to a separate one of the two or more TAGs; and
      to transmit, by the apparatus, at least two physical uplink control channels (PUCCHs) to at least two nodes of the two or more nodes, wherein each of the at least two PUCCHs is generated for a corresponding one of the at least two nodes.

5. The method of claim 1, wherein at least one node of the at least two nodes of the two or more nodes is a secondary cell.

6. The apparatus of claim 2, wherein at least one node of the at least two nodes of the two or more nodes is a secondary cell.

7. The computer program product of claim 3, wherein at least one node of the at least two nodes of the two or more nodes is a secondary cell.

8. The apparatus of claim 4, wherein at least one node of the at least two nodes of the two or more nodes is a secondary cell.

9. The method of claim 1, wherein the multiple uplink capability of the UE corresponds to a capability of the UE to tune to different transmission frequencies simultaneously.

10. The method of claim 1, wherein the at least two nodes of the two or more nodes include a booster or secondary node.

11. The method of claim 10, wherein the UE performs PUCCH transmission to the booster or secondary node according to a transmit power control command received from the booster or secondary node.

12. The method of claim 1, further comprising prioritizing a PUCCH transmission targeted to an anchor node in response to determining that maximum available power of the UE is not sufficient to transmit all of the at least two PUCCH transmissions.

13. The method of claim 1, further comprising scaling transmission power across PUCCH transmissions in response to determining that maximum available power of the UE is not sufficient to transmit all of the at least two PUCCH transmissions.

14. The UE of claim 2, wherein the multiple uplink capability of the UE corresponds to a capability of the UE to tune to different transmission frequencies simultaneously.

15. The UE of claim 2, wherein the at least two nodes of the two or more nodes include a booster or secondary node.

16. The UE of claim 15, wherein the UE performs PUCCH transmission to the booster or secondary node according to a transmit power control command received from the booster or secondary node.

17. The UE of claim 2, further comprising means for prioritizing a PUCCH transmission targeted to an anchor node in response to determining that maximum available power of the UE is not sufficient to transmit all of the at least two PUCCH transmissions.

18. The UE of claim 2, further comprising means for scaling transmission power across PUCCH transmissions in response to determining that maximum available power of the UE is not sufficient to transmit all of the at least two PUCCH transmissions.

19. The computer program product of claim 3, wherein the multiple uplink capability of the UE corresponds to a capability of the UE to tune to different transmission frequencies simultaneously.

20. The computer program product of claim 3, wherein the at least two nodes of the two or more nodes include a booster or secondary node.

21. The computer program product of claim 20, wherein the program code further includes program code for performing PUCCH transmission to the booster or secondary node according to a transmit power control command received from the booster or secondary node.

22. The computer program product of claim 3, wherein the program code further includes program code for prioritizing a PUCCH transmission targeted to an anchor node in response to determining that maximum available power of the UE is not sufficient to transmit all of the at least two PUCCH transmissions.

23. The computer program product of claim 3, wherein the program code further includes program code for scaling transmission power across PUCCH transmissions in response to determining that maximum available power of the UE is not sufficient to transmit all of the at least two PUCCH transmissions.

24. The apparatus of claim 4, wherein the multiple uplink capability of the apparatus corresponds to a capability of the apparatus to tune to different transmission frequencies simultaneously.

25. The apparatus of claim 4, wherein the at least two nodes of the two or more nodes include a booster or secondary node.

26. The apparatus of claim 25, wherein the apparatus performs PUCCH transmission to the booster or secondary node according to a transmit power control command received from the booster or secondary node.

27. The apparatus of claim 4, wherein the at least one processor is further configured to prioritize a PUCCH transmission targeted to an anchor node in response to determining that maximum available power of the apparatus is not sufficient to transmit all of the at least two PUCCH transmissions.

28. The apparatus of claim 4, wherein the at least one processor is further configured to scale transmission power across PUCCH transmissions in response to determining that maximum available power of the apparatus is not sufficient to transmit all of the at least two PUCCH transmissions.

* * * * *